United States Patent
Tironi et al.

(10) Patent No.: US 9,596,959 B2
(45) Date of Patent: Mar. 21, 2017

(54) DEVICE FOR COOKING CANNOLI SHELLS

(71) Applicants: Gene Tironi, Clinton Township, MI (US); Kolleen M. Tironi, Clinton Township, MI (US)

(72) Inventors: Gene Tironi, Clinton Township, MI (US); Kolleen M. Tironi, Clinton Township, MI (US)

(*) Notice: Subject to any disclaimer, the term of this patent is extended or adjusted under 35 U.S.C. 154(b) by 26 days.

(21) Appl. No.: 14/736,725

(22) Filed: Jun. 11, 2015

(65) Prior Publication Data

US 2015/0282670 A1 Oct. 8, 2015

Related U.S. Application Data

(63) Continuation of application No. 13/032,482, filed on Feb. 22, 2011, now Pat. No. 9,078,541.

(51) Int. Cl.
*A47J 37/12* (2006.01)
*A47J 37/10* (2006.01)

(52) U.S. Cl.
CPC ......... *A47J 37/108* (2013.01); *A47J 37/1295* (2013.01)

(58) Field of Classification Search
CPC .. A47J 27/00; A47J 37/00; A47J 37/12; A47J 37/1295
USPC ......... 99/431, 441, 426, 413, 416, 418, 415, 99/336, 354, 403
See application file for complete search history.

(56) References Cited

U.S. PATENT DOCUMENTS

| | | | |
|---|---|---|---|
| 2,957,404 | A | 10/1960 | Richardson |
| 4,417,509 | A | 11/1983 | Deibel et al. |
| 4,483,240 | A | 11/1984 | Dinh |
| 4,656,929 | A | 4/1987 | Dinh |
| 4,847,461 | A | 7/1989 | Gilmore |
| 5,431,092 | A | 7/1995 | Guillory |
| 7,024,987 | B2 | 4/2006 | Haber |
| 7,849,787 | B2 | 12/2010 | Flores |
| 2005/0217494 | A1 | 10/2005 | Hrushowy |
| 2006/0037486 | A1 | 2/2006 | Kurmlavage |
| 2008/0110352 | A1 | 5/2008 | Lazaroff et al. |
| 2009/0148567 | A1 | 6/2009 | Phillips |
| 2010/0136194 | A1 | 6/2010 | Schutte |

*Primary Examiner* — Michael Laflame, Jr.
(74) *Attorney, Agent, or Firm* — Brooks Kushman P.C.

(57) ABSTRACT

A device for cooking cannoli shells is comprised of a rack, a plurality of clips, a plurality of rods and a handle. The clips are attached to the upper side of the rack. The clips releasably secure the rods at a central section of each rod. The rods are shaped such that cannoli dough in the shape of a cannoli shell may be placed on each end of each rod, for a total of two shells per rod. The handles allow the device to be inserted into and removed from hot cooking oil. When the device is placed within a frying pan, the cannoli dough shell wraps on the rods are submerged below the surface of the cooking oil. Multiple racks may be releasably attached to each other to form a multiple tiered device which can be used with a frying pan deep enough to accommodate the device.

4 Claims, 4 Drawing Sheets

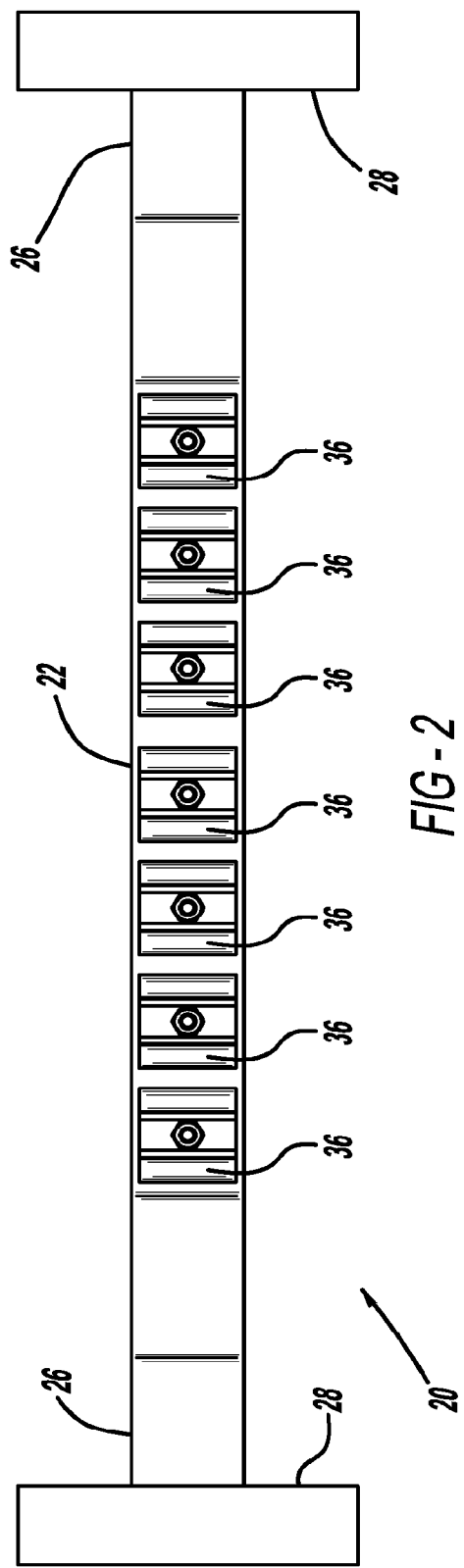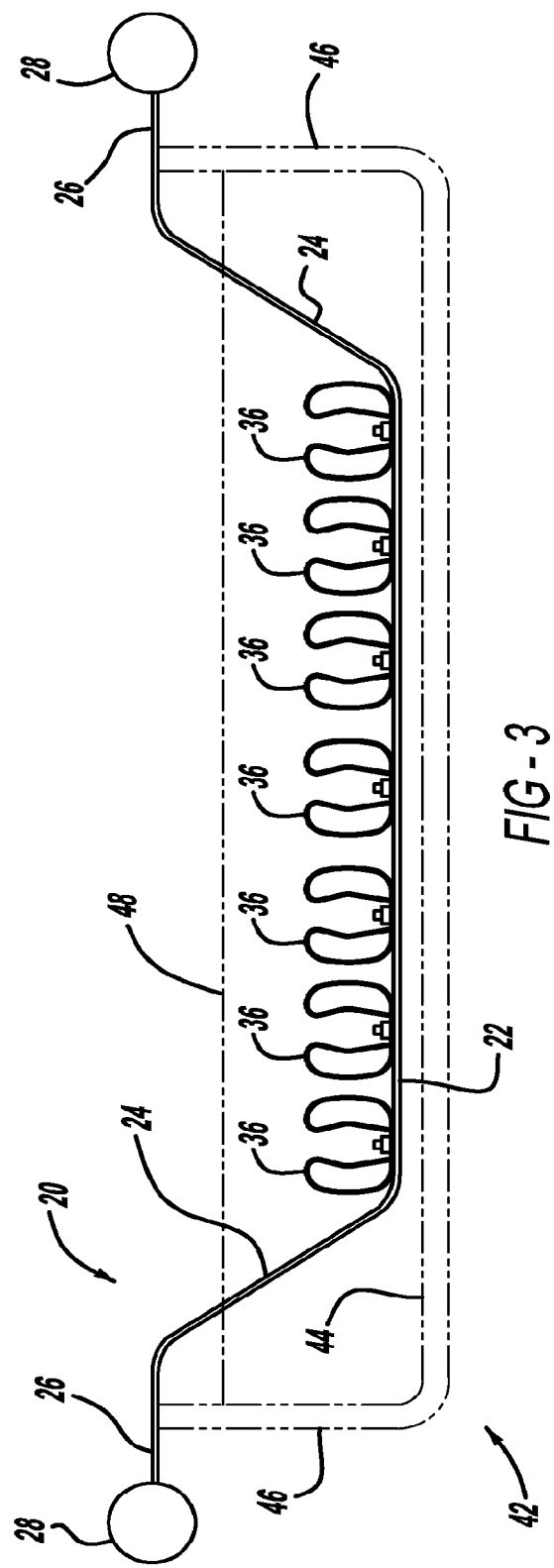

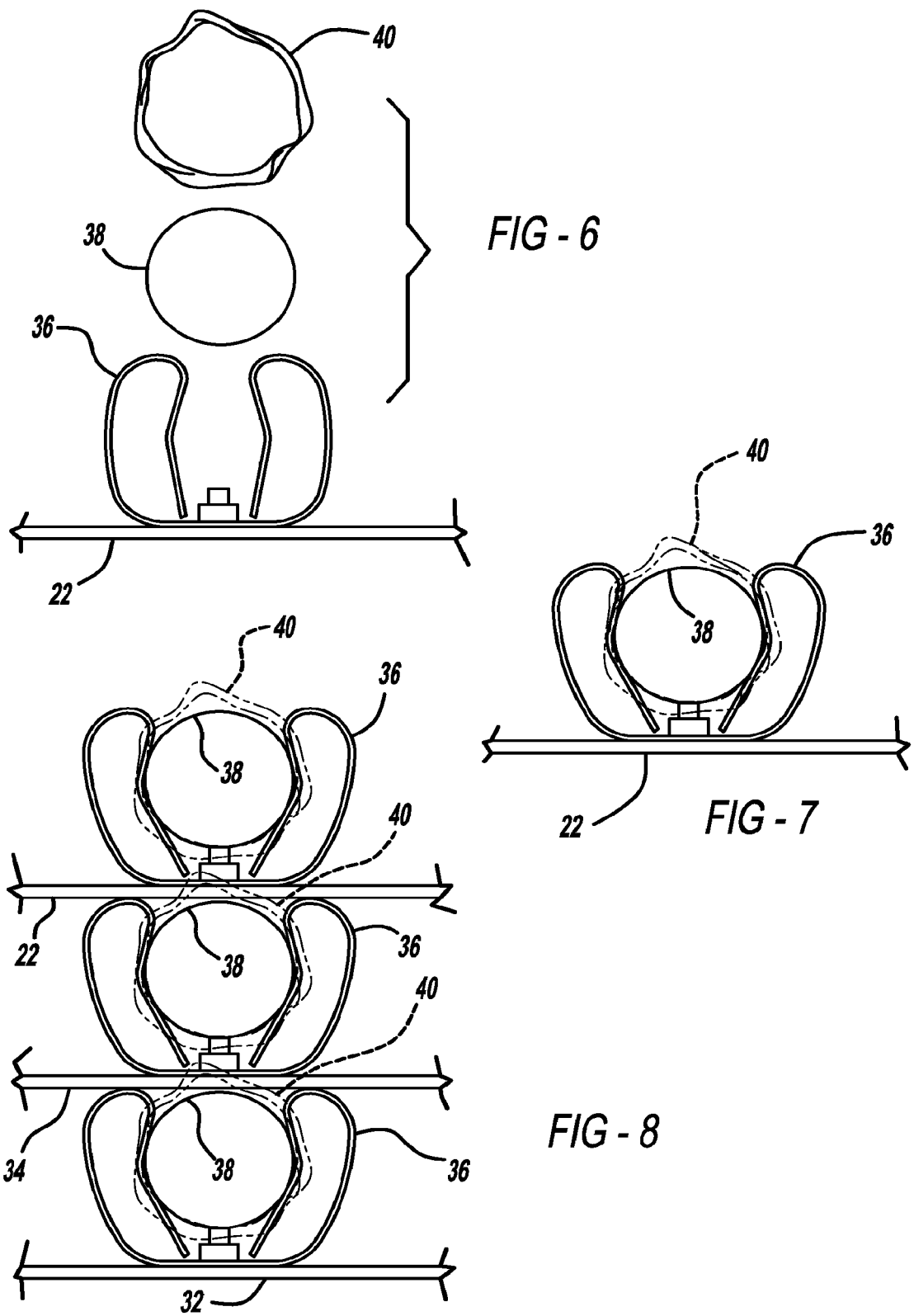

DEVICE FOR COOKING CANNOLI SHELLS

CROSS-REFERENCE TO RELATED APPLICATIONS

This application is a continuation of U.S. patent application Ser. No. 13/032,482 filed Feb. 22, 2011, currently pending, the disclosure of which is hereby incorporated in its entirety by reference herein.

BACKGROUND

Cannolis are fried pastry rolls. They have creamy fillings. Before the filling is placed within the cannoli, the cannoli shell must be cooked. The traditional method of cooking cannoli shells requires that circular sections of cannoli dough be wrapped around cylindrical forms. On or more of the dough wrapped cylindrical forms are then placed within hot cooking oil within a frying pan. During the cooking process the dough wrapped cylinders float. Therefore, they must be physically rotated while being cooked for the shells to be uniformly cooked. After the shells are cooked, the cylinders are removed from the cooking oil. Then the shells are removed from the cylinders.

The traditional method of cooking cannoli shells has limitations. Since the shells must be rotated during the cooking process, they must constantly be attended to while being cooked. Otherwise, the shells will be unevenly cooked. The number of dough wrapped cylinders placed within the cooking oil is also limited. They should not touch each other and they all float at the same level. As a result, the number of cannoli shells which may be simultaneously cooked using the traditional method is limited.

What is needed is a device for cooking cannoli shells which keeps the cannoli shells submerged below the surface of cooking oil while they are being cooked. Also needed is a device which maximizes the number of cannoli shells which may be simultaneously cooked by keeping the shells separated from each other during the cooking process and by allowing cannoli shells to be simultaneously cooked at varying depths within the cooking oil.

The device for cooking cannoli shells described herein satisfies these needs.

SUMMARY

The device for cooking cannoli shells described herein improves the efficiency and quality of the cannoli shell cooking process. The device allows many cannoli shells (typically 14-42) to be cooked simultaneously. It allows multiple cannoli shells to be cooked simultaneously without the need for turning the shells during the cooking process. The cannoli shells being cooked are held under the surface of the cooking oil, thereby allowing each cannoli shell to be uniformly cooked without manual intervention, such as the turning of the cannoli shells during the cooking process.

Multiple rods are attached to the device for cooking cannoli shells during the cooking process. Each rod contains two cannoli dough shell wraps. Cooking efficiency is obtained because a relatively large number of cannoli shells may be simultaneously cooked. Cooking quality is also enhanced because the shells are uniformly cooked rather than having some portions of the cannoli shells more cooked than others.

In its simplest form, a device for cooking cannoli shells is comprised of a rack, a plurality of clips, a plurality of rods and a pair of handles. The rack is sized and shaped to fit within a frying pan. A plurality of clips are attached to the rack. Each clip is adapted to releasably secure a rod. Each rod is sized and shaped to have cannoli dough wrapped around it in the shape of a cannoli shell. Preferably a cannoli dough wrap is placed on each end of a rod for a total of two wraps per rod. Each rod is releasably secured to a clip. The rods may be inserted and removed from the clips by hand. A handle extends from each end of the rack. The device for cooking cannoli shells is sized and shaped such that each of the rods will be positioned below the surface of cooking oil within a frying pan when the device rests within the frying pan.

The device for cooking cannoli shells may be comprised of multiple tiered racks. Each higher rack has an adapter which releasably plugs into a rack below it. The lowest rack is the bottom rack. The bottom rack has no adapter because its bottom surface is intended to be positioned on, or slightly above, the bottom surface of the frying pan.

BRIEF DESCRIPTION OF THE DRAWINGS

These and other features, aspects, and advantages of the present invention will become better understood with regard to the following description, appended claims, and accompanying drawings where:

FIG. 2 is a top plan view of the embodiment of a device for cooking cannoli shells of FIG. 3.

FIG. 3 is a side elevation view of the device for cooking cannoli shells of FIG. 2, positioned within a frying pan.

FIG. 6 is an exploded cutaway sectional elevation view of the non-inserted rod and cannoli dough shell of FIG. 4.

FIG. 7 is a cutaway sectional elevation view, wherein the rod of FIG. 6 is inserted into its respective clip.

FIG. 8 is a cutaway sectional elevation view of the device for cooking cannoli shells of FIG. 5 showing a rod with cannoli dough shells inserted into each clip.

DETAILED DESCRIPTION

Figure 1:
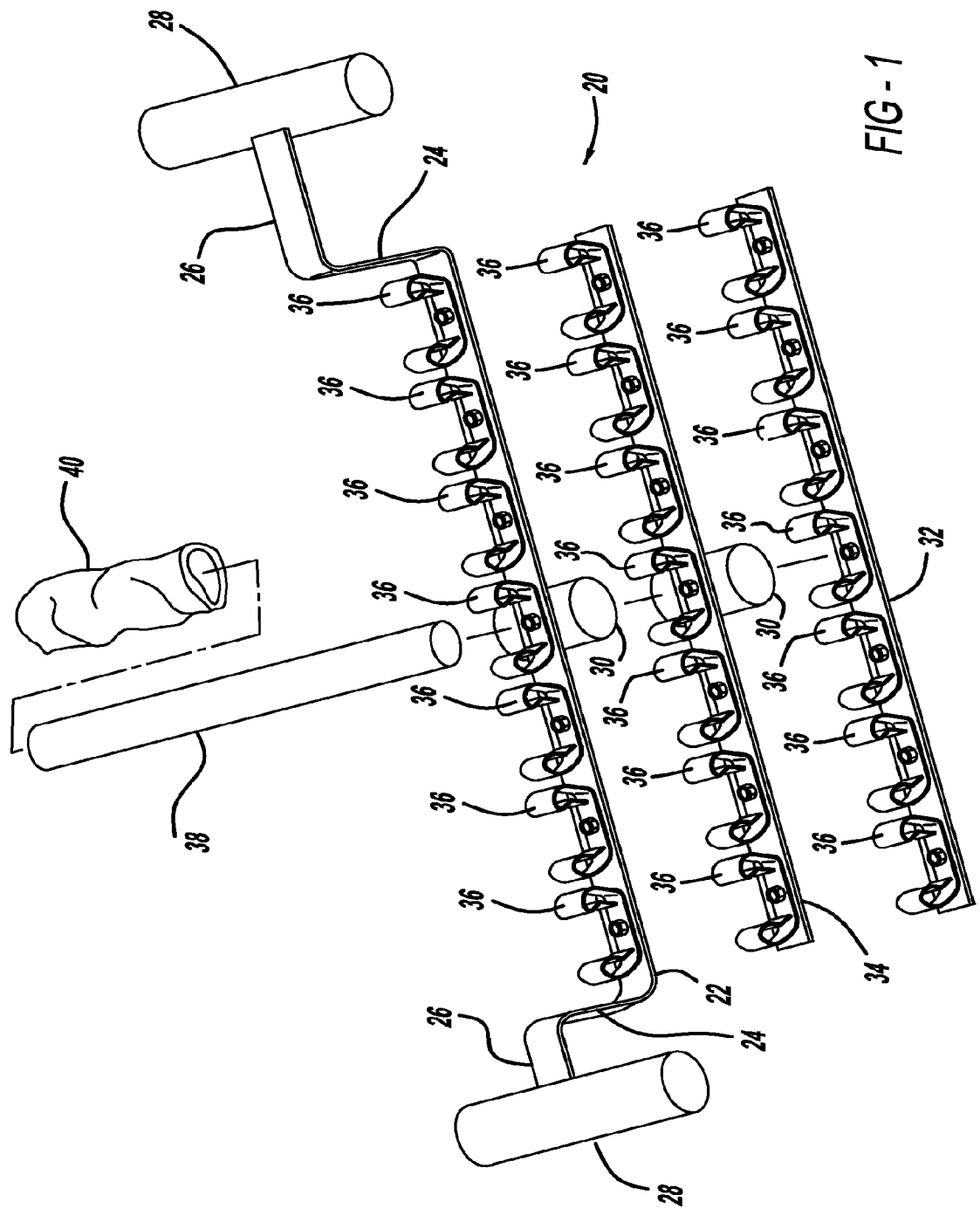
FIG. 1 is a perspective view of a device for cooking cannoli shells having three racks and showing the fit of cannoli dough onto a rod, the insertion of the rod into a clip on the first rack, the attachment of the first rack to an intermediate rack and the attachment of the intermediate rack to a bottom rack.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A device for cooking cannoli shells 20 in a frying pan 42 is comprised of a first rack 22, a plurality of clips 36, a plurality of rods 38 and a pair of handles 28. The rods 38 are analogous to cannoli cooking utensils alternatively known as forms, tubes or molds used in the cooking of traditional cannoli shells.

The first rack 22, as well as the optional intermediate racks 34 and bottom rack 32, should be fabricated from aluminum or stainless steel. These materials do not tend to degrade when placed within hot cooking oil 48, or to chemically interact with hot cooking oil 48. The length of the first rack 22, as well as the optional intermediate racks 34 and the bottom rack 32, is selected so that the rack 22, 34, 32 fits within the frying pan 42 with which the device 20 is intended to be used, as shown in FIG. 3. An upright member 24 extends from each end of the first rack 22, as shown in FIG. 1 and FIG. 3. The upright members 24 may extend perpendicularly from the first rack 22, as shown in FIG. 1, or they may extend at an angle, as shown in FIG. 3. In both instances the upright members 24 position the handles 28 above the first rack 22. A transverse member 26 extends from each upright member 24, as shown in FIG. 1 and FIG. 3. Preferably, the transverse members 26 and the first rack 22 are horizontally oriented and parallel to each other when the device 20 is placed within a frying pan 42. In the device 20 of FIG. 1, the upright members 24 and the first rack 22 form a U-shape. The first rack 22, the uptight members 24 and the transverse members 26 may be formed from a single piece of 0.125"×0.75" bar stock by bending it.

A plurality of clips 36 are attached to the upper side of the first rack 22. The clips 36 are adapted to releasably secure a rod 38. This means that a rod 38 may be snapped into and snapped out of a clip 36 by hand. Preferably, the clips 36 are also fabricated from aluminum or stainless steel for the same reasons stated for selecting such materials for the fabrication of the racks 22, 32, 34. Spring clips 36, known as Gibson clips 36, are the preferred clips 36 to be used. Gibson clips were patented in 1927 under U.S. Pat. No. 1,711,730. Gibson clips 36 will releasably secure the rods 38 without deforming. The clips 36 should be oriented on the racks 22, 32, 34 so that rods 38 placed within the clips 36 are perpendicularly oriented with respect to the racks 22, 32, 34.

In the preferred embodiment of the device for cooking cannoli shells 20, the first rack 22, its upright members 24 and the transverse members 26 extending from the upright members 24 are formed from a single piece of 0.125"×0.75" bar stock with a length of 25 inches. This bar stock is bent two times at a 90° angle leaving 13½ inches for the first rack 22 and 5¾" on each end for the upright members 24 and the transverse members 26. The transverse members 26 are formed by making a 90° outward bend leaving a 2¾" transverse member 26 at each end of the first rack 22, as shown in FIG. 1. Preferably, the transverse members 26 and the first rack 22 are parallel. This is also shown in FIG. 1. Seven typical Gibson/spring clips 36 may be mounted to the first rack 22 by drilling a mount hole centered in the middle of the first rack 22 with a 9/64 inch drill bit and spacing three similar additional mount holes on each side of the center hole spaced 1 13/16" between centers, for a total of seven clip mount holes. Typical Gibson clips 36 have detents on their bottom surfaces which may be used to prevent rotation of the clips 36 after installation. Recesses should be placed within the racks 22 to accommodate the clip detents. For typical Gibson clips 36, recesses should be provided on each side of the mount holes. The recesses may be made by partially drilling through the racks 22, 32, 34 with a 3/16" drill bit. The distance between the centers of the mount hole and each recess adjacent to it should be 5/16". It should be understood that this invention is not limited to the dimensions stated. A single piece of bar stock is not the only material from which racks 22, 32, 34 may be fabricated. The transverse member 26 to upright member 24 angle need not be 90°. The upright member 24 to the first rack 22 angle need not be 90°. The clips 36 need not be Gibson/spring clips 36. Although the clips 36 may be mounted to the racks 22, 32, 34 with bolts inserted through mounting holes secured by nuts, other methods of attachment are also included. Similarly, the clips 36 need not be provided with anti-rotation detents. Also, the number of clips 36 attached to each rack 22, 32, 34 may vary. The particular dimensions specified within this paragraph are ideal when the device 20 is intended to be used within a 12"×15"×3" skillet 42.

Figures 4, 5:
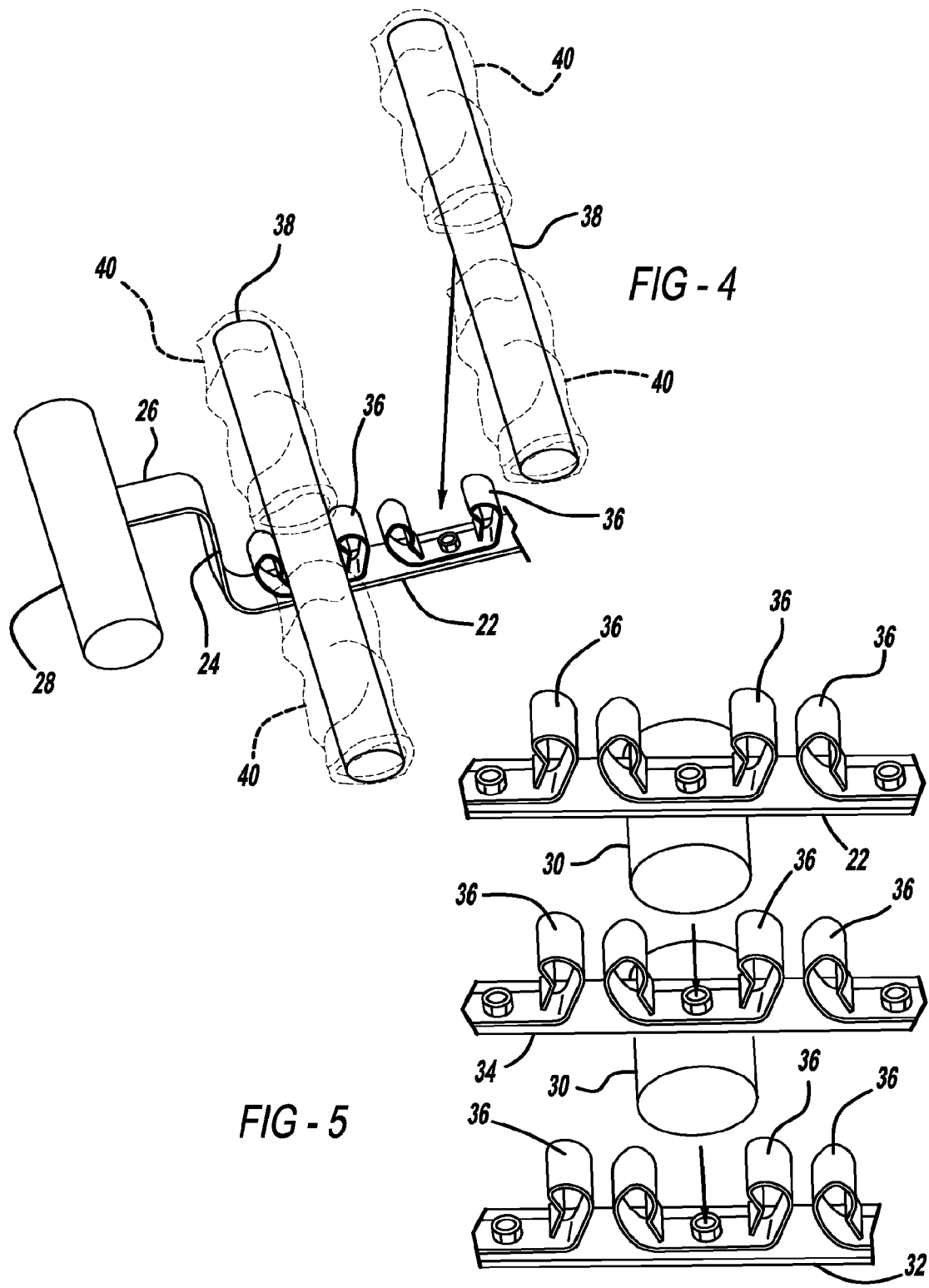
FIG. 4 is a partial perspective cutaway view of the first rack of a device for cooking cannoli shells showing a rod with two cannoli dough shells inserted into a clip and a second rod with two cannoli dough shells about to be inserted into a second clip.
FIG. 5 is a cutaway exploded perspective view of a device for cooking cannoli shells which has a first rack, an intermediate rack and a bottom rack.

Each rod 38 is releasably secured to a clip 36 at a central section of the rod 38. This is shown in FIG. 4. Approximately equal lengths of rod 38 extend on each side of its respective clip 36. Each rod 38 is sized and shaped to have cannoli dough 40 wrapped around it in the shape of a cannoli shell on each end of the rod 38 extending from its respective clip 36. This allows two cannoli dough 40 wraps on each rod 38. FIG. 4 shows two rods 38. One rod 38 is inserted into a clip 36, while the other rod 38 is about to be inserted into a clip 36. Each rod 38 has cannoli dough 40 wrapped around each of its ends. The cannoli dough 40 is wrapped in the shape of a cannoli shell. Thus, each rod 38 has two shells of cannoli dough 40 wrapped around it with the center section of the rod being uncovered so that it may be inserted into a clip 36 without the clip 36 impinging upon the cannoli dough 40. The device for cooking cannoli shells 20 is comprised of multiple clips 36. Each clip 36 can secure a rod 38. Each rod 38, is capable of holding two cannoli dough 40 shells. The device 20 will hold the shells under the surface of cooking oil 48 within a frying pan. The rods 38 are spaced apart from each other sufficiently so that the cannoli dough shell 40 wraps do not touch each other. Preferably, the rods 38 are fabricated from wood and have a circular cross-section of approximately 1 inch. The preferred rod 38 length is 9½ inches. The thermal properties of most woods are such that they may be physically handled shortly after the cooked shells are removed from the frying pan 42.

A handle 28 should be attached to each transverse member 26 at the end of the transverse member 26 which is opposite to the upright member 24 from which it extends. This is shown in FIG. 1 and FIG. 3. The handles 28 may be fabricated from the same material as the rods 38. The handles 28 should have a length of approximately 5 inches.

The length of the device 20 is such that each transverse member 26 extends over a wall 46 of the frying pan 42 when the rack 22 is placed within the frying pan 42 so that the handles 28 are positioned outside of the periphery of the frying pan 42. This is shown in FIG. 3. There, the handles 28 are shown outside the periphery of the frying pan 42. The length of each upright member 24 is such that each of the rods 38 will be positioned below the surface of cooking oil 48 within the frying pan 42 when the device 20 rests within the frying pan 42. This is also shown in FIG. 3. The upright members 24 are long enough to allow the clips 36 and rods to be positioned below the surface of the cooking oil 48. In traditional cannoli making, the cannoli shell floats on the surface of the cooking oil. Thus, during the making of cannoli shells using the conventional method, the shells need to be physically turned during the cooking process so that all of the cannoli dough is cooked. In the device 20 described herein all of the cannoli dough 40 on the rods 38 is held below the surface of the cooking oil 48. Therefore, rotation of the shells is not needed during the cooking process.

In an alternate embodiment of the device for cooking cannoli shells 20, the racks 22, 32, 34 (the device may have one, two, three or more racks) are suspended above the bottom 44 of the frying pan 42 when the device 20 is placed within the frying pan 42, as shown in FIG. 3. There, a gap is shown between the bottom of the rack 22 and the bottom of the frying pan 44. This gap is created by setting the length of each upright member 24 such that the walls of the frying pan into which the device 20 is intended to be placed support the device 20 at the transverse members 26, thereby suspending the rack 22 above the bottom 44 of the frying pan 42.

The device for cooking cannoli shells in a frying pan 20 may be comprised of only one (the first) rack 22 with a plurality of clips 36 attached to it. Alternatively, the device 20 may be comprised of two or more tiered racks 22, 32, 34. By tiering the racks 22, 32, 34, significantly more cannoli shells may be cooked at one time compared to the number of cannoli shells which may be cooked with a single rack 22 device 20. For example, a single rack 22 device 20 with seven clips 36 will allow 14 cannoli shells to be cooked at the same time, while a triple rack 22, 32, 34 device 20 will allow 38 cannoli shells to be cooked at the same time. The frying pan 42 must be deep enough to allow all of the rods 38 (as well as the cannoli dough 40 which is wrapped around the rods 38) on all of the racks 22, 32, 34 to be covered by cooking oil 48. FIG. 3 shows a single rack 22 device 20. A deeper frying pan 42 would be needed for a device 20 with multiple tiered racks 22, 32, 34.

Multiple tiered devices for cooking cannolis shells 20 will have a bottom rack 32 on the lowest tier, as shown in FIG. 1 and FIG. 5. The bottom rack 32 is constructed to the same configuration as the first rack 22, except that the bottom rack 32 has no upright members 24, transverse members 26, handles 28 or adapter 30. The bottom rack 32 will be positioned below all other racks 22, 34 when the device 20 is placed within a frying pan 42. The bottom rack 32 has a plurality of clips 36 attached to its upper side. These may be the same type of clip 36 as used on the first rack 22. The bottom rack 32 clips 36 are adapted to releasably secure a rod 38, as described for the first rack 22. A plurality of rods 38 are releasably secured to the clips 36 on the bottom rack 32 at a central section of each rod 38. The rods 38 are the same type of rods 38 attached to the first rack 22. They are sized and shaped to have cannoli dough 40 wrapped around them in the shape of a cannoli shell on each end of each rod 38 extending from a clip 36, as described for the first rack 22. Again, this will result in two cannoli dough wraps 40 on each rod 38 of the bottom rack 32. An adapter 30 is attached to a central section of the lower side of the first rack 22. This adapter 30 is sized and shaped to be releasably secured to a clip 36 on the bottom rack 32. The adapter 30 may simply be a 2 inch length of a rod 38. In order to attach the first rack 22 directly to the bottom rack 32, the adapter 30 of the first rack 22 is plugged into a clip 36 on the bottom rack 32 to form a two-tier assembly.

Devices for cooking cannoli shells 20 may also be comprised of three or more racks 22, 32, 34 by positioning one or more intermediate racks 34 between a first rack 22 and a bottom rack 32. A three-tiered assembly is shown in FIG. 1. An intermediate rack 34 has the same construction and configuration as the previously described bottom rack 32, with the addition of an adapter 30. This adapter 30 is attached to a central section of the lower side of each intermediate rack 34, as shown in FIG. 1 and FIG. 5. This adapter 30, like the others, is sized and shaped to be releasably secured to a clip 36 on another rack 32, 34. Again, the adapter 30 may simply be a 2 inch length of a wooden rod 38, as previously described. The adapter 30 of an intermediate rack 34 is releasably secured to a clip 36 on a rack 34, 32 positioned below it. In other words, the adapter 30 of an intermediate rack 34 is plugged into a clip 36 on a rack 34, 32 below it. For a three-tiered assembly, the adapter 30 of the intermediate rack 34 is plugged into a clip 36 on the bottom rack 32 and the adapter 30 of the first rack 22 is plugged into a clip 36 on the intermediate rack 34 to form the three-tiered assembly, as shown in FIG. 1 and FIG. 5. The dimensions of the device 20 are such that the multiple cannoli dough shells 40 on the rods 38 of any multitier device do not touch each other. The clips 36 and rods 38 used on an intermediate rack 34 are the same as the clips 36 and rods 38 used on the first rack 22. The primary difference between an intermediate rack 34 and a bottom rack 32 is that an adapter 30 is attached to the bottom surface of an intermediate rack 34, while a bottom rack 32 has no adapter 30 attached to its bottom surface.

In order to use the device for cooking cannoli shells 20 an appropriate number of rods 38 are retrieved. Two cannoli shells may be cooked on each rod. Therefore, two cannoli dough wraps 40 are placed on each rod 38—one wrap 40 on each end of the rod 38, as shown in FIG. 4. Typically, the cannoli dough 40 is cut into a circular piece. This circular piece of cannoli dough 40 is then wrapped around one end of a rod 38 and pinched together with egg white. Similarly, another circular piece of cannoli dough 40 is wrapped around the other end of the rod 38 and pinched together with egg white. The center section of the rod 38, where it contacts its respective clip 36 is a left uncovered by cannoli dough 40. After the desired number of rods 38 are covered with cannoli dough wraps 40, the center section of each rod 38 is plugged into a clip 36 on a rack 22, 32, 34. See, for example, FIG. 4. For a single rack device 20, all of the rods 38 are inserted into clips 36 on the first rack 22. When multiple tiered racks 22, 32, 34 are used dough covered rods 38 are inserted into the clips 36 of the other racks 32, 34. If multiple tiered racks 22, 32, 34 are used, the racks 22, 32, 34 are attached to each other by plucking the adapter of each upper rack 22, 34 into a lower rack 34, 32. For a three-tiered assembly this process is shown in FIG. 1 and FIG. 5. The device for cooking cannoli shells 20 is then placed within a frying pan 42 containing hot cooking oil 48. The frying pan 42 must be deep enough to cover all of the rods 38 and the cannoli dough 40 surrounding the rods 38. All of the cannoli dough shell wraps 40 are kept below the top surface of the cooking oil 48 during the cooking process. A typical cooking oil temperature is 375° F. When the cannoli dough shells are fully cooked the device 20 is removed from the frying pan 42. The finished cannoli shells are stripped from the rods 38. The rods 38 are removed from the clips 36. If desired, another batch of cannoli shells is then cooked using the same process.

Although the invention has been shown and described with reference to certain preferred embodiments and methods, those skilled in the art undoubtedly will find alternative embodiments and methods obvious after reading this disclosure. With this in mind, the following claims are intended to define the scope of protection to be afforded the inventor, and those claims shall be deemed to include equivalent constructions insofar as they do not depart from the spirit and scope of the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device for cooking cannoli shells in a frying pan comprising:
   a main rack configured to hang on top of a rim of a frying pan and cook cannoli shells within the frying pan, the main rack having a longitudinal base with a length and a width, an upright member at each end of the base extending upward and transverse from the base, and a transverse member extending transversely from each upright member at a location spaced from the base, wherein the transverse members are configured to hang on top of the rim on opposing sides of the frying pan while enabling the main rack to hang below a fluid level within a frying pan and the upright members extend down into the frying pan, the base having an upper side and a lower side;
   a plurality of rods sized and shaped to have cannoli dough wrapped around each rod in the shape of a cannoli shell; and
   a plurality of clips each having a lower mating surface fastened to a corresponding upper mating surface on the upper side of the base, and a pair of opposing side members extending away from the lower mating surface, the side members being biased to provide securing resistance about a section of the rod such that each rod extends in a direction along the width of the base and at least partially above the base when attached to one of the clips, the clips arranged end-to-end along the upper side of the base.

2. The device of claim 1, further comprising a second plurality of rods mounted to the lower side of the main rack beneath the plurality of rods, and a secondary rack having a second plurality of clips securable to the second plurality of rods to secure the secondary rack beneath the main rack and enabling cooking of multiple layers of cannoli shells within the frying pan.

3. The device of claim 2, further comprising an adapter rod secured to the underside of the base of the main rack, wherein the second plurality of clips on the secondary rack are securable to the adapter rod to secure the secondary rack to the main rack to enable cooking of multiple layers of cannoli shells within the frying pan.

4. The device of claim 3, wherein the adapter rod is cylindrical and extends transverse to the length of the base of the main rack.

* * * * *